United States Patent
Weber

(10) Patent No.: US 6,640,794 B2
(45) Date of Patent: Nov. 4, 2003

(54) INTAKE SYSTEM FOR AN INTERNAL COMBUSTION ENGINE WITH A MEMBRANE PREFERENTIALLY PERMEABLE TO OXYGEN MOLECULES

(75) Inventor: Olaf Weber, Friolzheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/206,862

(22) Filed: Jul. 29, 2002

(65) Prior Publication Data

US 2003/0024513 A1 Feb. 6, 2003

Related U.S. Application Data

(63) Continuation of application No. PCT/EP00/12461, filed on Dec. 9, 2000.

(30) Foreign Application Priority Data

Jan. 27, 2000 (DE) .......................................... 100 03 525

(51) Int. Cl.[7] .............................................. F02B 23/00
(52) U.S. Cl. ................... 123/585; 123/198 E; 55/385.3
(58) Field of Search ............................. 123/585, 198 E; 60/274; 55/385.3

(56) References Cited

FOREIGN PATENT DOCUMENTS

| DE | 19710840 | 9/1998 |
|---|---|---|
| GB | 2339240 | 1/2000 |
| JP | 60-011667 | 1/1985 |
| JP | 60-088858 | 5/1985 |
| JP | 60-090975 | 5/1985 |
| JP | 60-095150 | 5/1985 |
| JP | 362199958 A | * 9/1987 |

* cited by examiner

*Primary Examiner*—Noah P. Kamen
(74) *Attorney, Agent, or Firm*—Crowell & Moring LLP

(57) ABSTRACT

An intake system (13) for an internal combustion engine (12) which includes a housing (15a) with a filter insert (16) and a membrane (22) for separating nitrogen and enriching the combustion air with oxygen. The membrane is integrated into the filter housing so as to save construction space and provide a lower cost system. The membrane (22) can alternatively be arranged on the clean air side of the air filter insert (16) to prevent the membrane from being soiled and to improve the functional reliability of the oxygen enrichment. Alternatively, instead of arranging the membrane (22) on the clean side of the filter insert (16), the membrane can be protected from being soiled by using a cover (23).

11 Claims, 1 Drawing Sheet though the filter insert, so that contamination of the membrane can be largely avoided. Replacing the membrane is therefore unnecessary. To install the membrane, space must be provided within the intake system on the clean air
INTAKE SYSTEM FOR AN INTERNAL COMBUSTION ENGINE WITH A MEMBRANE PREFERENTIALLY PERMEABLE TO OXYGEN MOLECULES

CROSS REFERENCE TO RELATED APPLICATIONS

This application is a continuation of international patent application no. PCT/EP00/12461, filed Dec. 9, 2000, designating the United States of America, the entire disclosure of which is incorporated herein by reference. Priority is claimed based on Federal Republic of Germany patent application no. DE 100 03 525.6, filed Jan. 27, 2000.

BACKGROUND OF THE INVENTION

The invention relates to an intake system for an internal combustion engine, which comprises a conventional air filter for filtering the air and a membrane that is preferentially permeable to oxygen molecules.

The use of membranes for oxygen enrichment of the combustion air is known in the art. Commercial designations for known materials used for oxygen enrichment of the air include, for example, silicon and polysulfone. Published German patent application no. DE 197 10 840 A1 proposes such a system. According to the single figure of this document, this system comprises an intake tract in which an air filter 22 is arranged. In addition, there is another housing, which is provided with a membrane that is preferentially permeable to oxygen molecules. This housing is also connected with the intake tract so as to create a parallel connection of the described air filter 22 and membrane 32. Depending on the position of throttle valves 24 and 34, the combustion air can be enriched with oxygen.

Such an enrichment of the intake air supplied to the engine increases the temperature of the exhaust gas and thus shortens the catalyst initiation time, i.e., the time that passes before the catalyst reaches its operating temperature and thus develops its full effect. In addition, fuel conversion in the engine is improved. This makes it possible to reduce the emission of carbon monoxide and hydrocarbons in the exhaust gas. The nitrogen content of the combustion gases is also reduced, so that fewer nitrogen oxides are generated. Thus, environmental pollution due to the exhaust gasses of the internal combustion engine can be decreased overall.

The use of membrane technology to enrich the combustion air with oxygen, however, creates additional component costs for the intake system. Furthermore, it increases the overall space requirement within the vehicle. The total volume available in modern motor vehicles is limited, however. Moreover, at the same time there is great interest in economically efficient solutions.

SUMMARY OF THE INVENTION

Accordingly, it is an object of the invention to provide an improved intake system for an internal combustion engine which can produce an intake air stream with an enriched oxygen content.

Another object of the invention is to provide an intake system for an internal combustion engine, which comprises an air filter and a membrane that is preferentially permeable to oxygen molecules.

A further object of the invention is to provide an intake system for an internal combustion engine with a membrane that is preferentially permeable to oxygen and which is inexpensive to manufacture and economical to operate.

These and other objects are achieved in accordance with the present invention by providing an intake system for an internal combustion engine, comprising an intake passage that connects an intake opening with at least one cylinder inlet of the internal combustion engine; an air filter housing arranged as part of the intake passage; a filter insert arranged in the air filter housing such that a flow of air drawn through the intake passage will pass through the filter insert; and a membrane preferentially permeable to oxygen molecules, the membrane being arranged in the intake passage such that a flow of air drawn through the intake passage will pass through the membrane; wherein the membrane is integrated into the air filter housing and forms part of a wall of the air filter housing.

The intake system according to the invention comprises an intake passage in which at least one air filter and a membrane preferentially permeable to oxygen molecules are accommodated. The term intake passage should be understood in a broad sense as a structure that forms the intake path from an intake opening up to at least one cylinder inlet of the internal combustion engine. Additional components that are essential to the functioning of the internal combustion engine are accommodated in this intake path. For instance, a throttle valve and an intake manifold comprising a plenum and at least one intake port per cylinder form part of the intake passage.

According to the invention, the membrane is built into the air filter housing. This integration saves space as well as weight of the components of the intake system. At the same time, a corresponding configuration can save production costs to make the proposed solution more economically efficient.

In accordance with a further embodiment of the invention, the membrane is arranged parallel to the filter insert in relation to the airflow. This variant is particularly simple to realize if the membrane is accommodated within the air filter housing. The parallel flow consistently ensures a minimum flow of combustion air through the filter insert.

One advantageous embodiment is obtained if the membrane forms part of the air filter housing. This creates an especially space saving variant since the surfaces of the filter housing are available in any case. They can then be used to enrich the combustion air with oxygen. Due to the pressure drop across the membrane used, a large membrane surface is necessary to enrich the air as much as possible with oxygen.

It is advantageous to provide the membrane, which forms a portion of the wall of the air filter housing, with a shield. This shield protects the membrane against contaminants, e.g., against road spray that may enter the engine compartment. Contamination of the membrane would impair its function and thus reduce its separation efficiency. The shield may, for example, comprise a cover, which is provided in the engine compartment for reasons of appearance or noise dampening. These covers are increasingly attached directly to the air filter housing so that their shielding effect can simultaneously be used to protect the membrane.

An alternative measure to reduce the operating costs of the internal combustion engine or to improve the function of the intake system is to arrange the membrane behind the air filter as seen in flow direction of the intake air. In this way, the membrane is contacted only by clean air that has been filtered by the filter insert, so that contamination of the membrane can be largely avoided. Replacing the membrane is therefore unnecessary. To install the membrane, space must be provided within the intake system on the clean air side. This space can, in particular, also be located within the air filter housing. This makes it possible to obtain the above-described advantages regarding space utilization.

According to a further development of the integration concept, the intake manifold for the internal combustion engine is also integrated with the housing for the filter insert. This results in a particularly compact construction. The separating wall between the air filter housing parts and the manifold can advantageously be used to accommodate the membrane. This makes it possible to utilize a larger area for accommodating the membranes without increasing the overall volume of the intake system.

The membrane does not need to be configured as a foil, although a foil is particularly easy to integrate into parts of the wall of the filter housing. One measure to increase the effective membrane surface, however, is to use hollow fiber membranes. The ends of these membranes can, for instance, be integrally molded into a wall part of the housing, so that a space saving geometry is again obtained.

It is advantageous to arrange a throttling member parallel to the membrane in the intake passage. This function can be assumed, for instance, by the throttle valve, which is in any case provided in the intake tract. If this throttle valve is arranged parallel to the membrane, the intake air stream can be throttled only to a degree where the main intake airflow guided through the filter insert is completely shut off. The secondary flow that is drawn through the membrane is always available in the intake tract. Thus the amount of air sucked through the membrane must be less than or equal to the amount of air required during idling. In this manner, the largest possible amount of oxygen-enriched air is always made available.

It is also possible, however, to arrange a throttling member in the secondary airstream of the intake passage, which is connected in series with the membrane. In conjunction with the throttle valve in the intake passage, the air supply to the internal combustion engine can thus be completely blocked. In addition, the air amount drawn in through the membrane can thereby be regulated, making it possible also to influence the degree of oxygen enrichment of the combustion air. In this embodiment of the intake system, it is possible to use a membrane that allows a greater amount of air to pass through than is required during idling.

To be able to control the oxygen content, a sensor may be provided in the intake passage, which determines not only the amount of air being passed through but also its oxygen content. These measured values can be used to determine the amount of oxygen supplied to the internal combustion engine and to control that amount through corresponding adjustment of the throttling members.

These and other features of preferred embodiments of the invention, in addition to being described in the specification and drawings, are also set forth in the claims. The individual features may be implemented either alone or in combination in embodiments of the invention or in other fields of use and may represent advantageous, separately protectable embodiments, for which protection is hereby claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
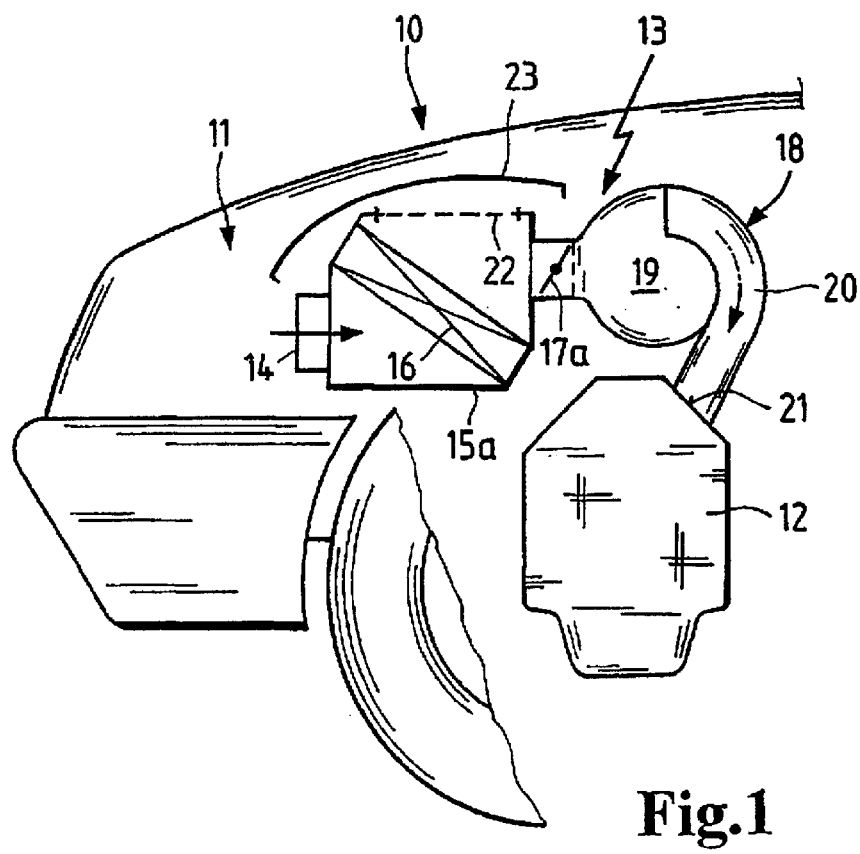
FIG. 1 is a schematic section through an intake system with an air filter housing having an oxygen selective membrane in the engine compartment of a motor vehicle.

FIG. 1 shows a front end 10 of a motor vehicle with an engine compartment 11. The engine compartment holds an internal combustion engine 12, which includes an intake passage 13 comprising an intake opening 14 in a housing 15a, with a filter insert 16, a throttling member 17a and an intake manifold 18. The intake manifold has a plenum 19 and intake pipes 20, only one of which is shown. The intake pipes end in cylinder inlets 21 on the internal combustion engine.

A portion of the wall of housing 15a on the clean side is constructed as a membrane 22. This results in a parallel connection of the membrane relative to the filter insert 16. The intake air stream as a whole can be regulated by throttling member 17a.

To protect the membrane, a shield 23 is mounted outside housing 15a. This can, for instance, be a cover to improve the visual appearance of the engine and to shield against noise. At the same time, shield 23 protects membrane 22 against contaminants. In addition, membrane 22 is arranged in an area of the engine compartment directly under the engine hood, where the membrane is less likely to be contaminated than in lower lying areas of the internal combustion engine compartment.

Figure 2:
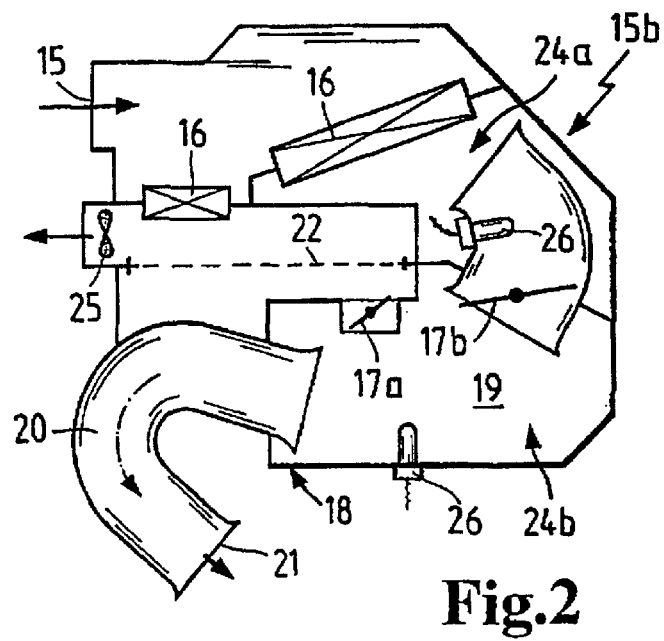
FIG. 2 is a schematic section through a housing in which an intake manifold, an air filter and an oxygen selective membrane are integrated.

FIG. 2 is a schematic section through a housing 15b. This housing comprises an intake opening 15, filter inserts 16, plenum 19, and intake pipes 20, which end in cylinder inlets 21. Membrane 22 is arranged as the separation plane between a housing part 24a for filter inserts 16 and a housing part 24b forming the intake manifold 18. Parallel to membrane 22, a throttling member 17b is provided, which regulates the main air stream supplied to the internal combustion engine. In addition, a secondary throttling member 17a to control the amount of air passing through the membrane may be connected in series with membrane 22. This secondary throttling member can also be eliminated, however, if the oxygen enriched air stream guided through membrane 22 is less than the intake air required in the idling phase of the internal combustion engine.

Membrane 22 is arranged in a separate chamber or area, such that the nitrogen-enriched air in front of membrane 22 cannot get into plenum 19 through throttling member 17b. To increase the efficiency of membrane 22, a blower 25 may furthermore be provided to remove the nitrogen-enriched air from the vicinity of the membrane 22.

Sensors 26 may be provided to measure on the one hand the flow rate of the intake air and on the other hand its oxygen content. By evaluating the measurement results, the amount of oxygen that is supplied to the internal combustion engine can then be determined. To influence the amount of oxygen and the amount of air, throttling members 17a and 17b may be controlled in their interactively.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intake system for an internal combustion engine, comprising:
    an intake passage that connects an intake opening with at least one cylinder inlet of the internal combustion engine;

an air filter housing arranged as part of said intake passage;

a filter insert arranged in said air filter housing such that a flow of air drawn through said intake passage will pass through said filter insert; and a membrane preferentially permeable to oxygen molecules, said membrane being arranged in said intake passage such that a flow of air drawn through said intake passage will pass through said membrane;

wherein said membrane is integrated into the air filter housing and forms part of an exterior wall of said air filter housing.

2. An intake system according to claim 1, wherein said membrane is arranged in parallel with said filter insert such that the air drawn through said intake passage flows either through said membrane or through said filter insert.

3. An intake system according to claim 1, further comprising a shield arranged over said membrane for protecting the membrane against contaminants.

4. An intake system according to claim 3, wherein said shield comprises a cover for improving the visual appearance of the intake system.

5. An intake system according to claim 1, wherein the membrane is arranged in series with a throttle member for controlling the air flow volume drawn through said intake passage.

6. An intake system according to claim 5, wherein the membrane is arranged upstream from the throttle member in direction of air flow.

7. An intake system according to claim 5, wherein the membrane is arranged downstream from the throttle member in direction of air flow.

8. An intake system for an internal combustion engine, comprising:

an intake passage that connects an intake opening with at least one cylinder inlet of the internal combustion engine;

an air filter housing arranged as part of said intake passage;

a filter insert arranged in said air filter housing such that a flow of air drawn through said intake passage will pass through said filter insert; and a membrane preferentially permeable to oxygen molecules, said membrane being arranged in said intake passage such that a flow of air drawn through said intake passage will pass through said membrane;

wherein said membrane is integrated into the air filter housing and forms part of a wall of said air filter housing; and wherein at least part of said intake passage is comprised of an intake manifold formed in one piece with said air filter housing.

9. An intake system according to claim 1, wherein said membrane is arranged in series with said filter insert such that air drawn through said intake passage flows first through said filter insert and thereafter through said membrane.

10. An intake system according to claim 8, wherein the membrane is constructed as a partition between an air filter housing part and an intake manifold part.

11. An intake system according to claim 1, wherein said membrane is arranged in parallel with a throttle member for controlling the air flow volume drawn through said intake passage.

* * * * *